Patented Apr. 19, 1927.

1,624,930

UNITED STATES PATENT OFFICE.

LEO P. CURTIN, OF FREEHOLD, NEW JERSEY, ASSIGNOR TO THE WESTERN UNION TELEGRAPH COMPANY, OF NEW YORK, N. Y., A CORPORATION OF NEW YORK.

WOOD PRESERVATIVE.

No Drawing. Application filed December 28, 1925. Serial No. 78,001.

This invention relates to the art of wood-preservation, and comprises a method of treating wood whereby the growth therein of wood-rotting fungi may be inhibited. My invention includes also the treated product resulting from the practice of said method.

For the preservation of timber it is usual practice to impregnate it with various materials, of which zinc chlorid and creosote are typical, which are recognized as having a toxic character. Such methods are effective so long as the preservative is retained by the timber in quantity above the toxic concentration limit; but in many cases there is a gradual loss of the toxic body by solution, oxidation, vaporization or otherwise. It has likewise been proposed to deposit toxic bodies of low solubility within the body of the timber, whereby a greater degree of permanence of the preservative action may be attained. But so far as I am aware, in all cases where protection against wood-rotting fungi was sought, reliance has been placed on the toxic character of the impregnating agent.

I have now discovered that the growth of wood-rotting fungi may be inhibited by certain materials which need not have a toxic character; although of course the possession of toxicity is not objectionable for the purposes of this invention, and is distinctly advantageous as protecting the timber against attack, especially by insects or organisms other than the wood-rotting fungi. The preservatives used in accordance with this invention are basic bodies, or bodies capable of neutralizing weak acids; and are preferably salts of strong bases with weak acids. My preferred preservative is the carbonate of barium.

My investigations of the wood-rotting fungi have shown that they possess, in common with certain other fungi and certain bacteria, the property of liberating acid products of growth. I have demonstrated this by growing these fungi in culture media containing an indicator for acidity, and noting that in all cases a change in the direction of acid conditions accompanied this growth, although not all so-called indicators are capable of showing this change.

My investigations showed definitely that the growth of fungi, including those of the wood-rotting type, is accompanied by the liberation of considerable quantities of acid-reacting bodies. The wood rotting fungus, *Fomes annosus*, was sufficiently acidic to give a sharp color change with sodium alizarin sulphonate from red to yellow, the color of the free sulphonic acid. This was easily the most satisfactory of the various indicators used. The color change with litmus, while clearly evident, did not offer such a contrast. There were no color changes with the less sensitive congo red and methyl orange. The latter indicator is very satisfactory in cases where the fungus gives a sufficiently high hydrogen-ion concentration to produce the color change. To ascertain the behavior of other fungi, a series of cultures were prepared with results as indicated in the table given below. In each case, uninoculated samples of nutrient were prepared to show that the liberation of acid was due solely to the growing fungus. These sterile blanks retained their original basic color throughout the life of the experiment:

| Fungus. | Indicator. | Original (basic) color. | Final (acidic) color. |
|---|---|---|---|
| *Wood rotting* | | | |
| Fomes annosus | Litmus | Violet | Purplish red. |
| Do | Sodium alizarin sulphonate. | Red | Greenish yellow. |
| Do | Congo red | do | No change. |
| Do | Methyl orange | Yellow | Do. |
| Lenzites sepiaria | do | do | Do. |
| Do | Sodium alizarin sulphonate. | Red | Greenish yellow. |
| Lentinus lepideus | Methyl orange | Yellow | No change. |
| Do | Sodium alizarin sulphonate. | Red | Greenish yellow. |
| Polyphorus pilotæ. | Methyl orange | Yellow | No change. |
| Do | Sodium alizarin sulphonate. | Red | Greenish yellow. |
| Polyphorus sulphureus. | Methyl orange | Yellow | No change. |
| Do | Sodium alizarin sulphonate. | Red | Greenish yellow. |
| *Mould* | | | |
| Rhizopus nigricans. | Litmus | Violet | Red. |
| Do | Sodium alizarin sulphonate. | Red | Greenish yellow. |
| Do | Congo red | do | Violet. |
| Do | Methyl orange | Yellow | Red. |
| Penicillium | Sodium alizarin sulphonate. | Red | Greenish yellow. |
| Do | Methyl orange | Yellow | No change. |

The nutrient medium was 1.5% agar-agar and 2.5% malt extract, to which sufficient indicator was added to color it strongly.

Quantitative tests have shown that the amounts of acid set free by the wood-rotting fungi are considerable. One such test will be cited by way of example: Ten c. c. of standard nutrient medium was prepared which contained approximately 300 milligrams of dry matter and sufficient sodium alizarin sulphonate to color it deep red. Exactly 10 milligrams of $Na_2CO_3$ was dissolved in the hot solution. After cooling and solidifying, the nutrient was inoculated with a very small transplant of *Fomes annosus*. There was no sign of growth until the fifth day when growth commenced with progressive decolorization of the culture. After twelve days the red color had entirely disappeared and the growth had reached almost to the edge of the dish. (The indicator change precedes the visible growth by a short distance ranging from one or two millimeters in the case of *Fomes annosus* to one or two centimeters in the case of *Rhizopus nigricans*). This signified that acid equivalent to 12 milligrams of acetic acid had been produced in seven days' growth from a small transplant. The carbonate functioned as a di-acid base in this reaction since sodium alizarin sulphonate retains its red color in the presence of sodium bicarbonate. The acid production would be much greater if the experiment were continued as there was undoubtedly considerable nutrient matter remaining. As it was, the conversion of 4% of the total dry matter into acid (computed as acetic) in seven days is indicated.

At this point, the entire culture was dissolved in hot water and dilute alkali was added. The original brilliant red color of the indicator was immediately restored. The entire experiment was repeated with a larger culture containing 3 grams dry matter, (agar plus malt extract), and .1 gram sodium carbonate. This checked with the first experiment except that the indicator was not entirely decolorized until after two weeks' growth. It is probable that the production of acid in these cases was abnormally high, due to the presence of the base.

It will be observed that in the foregoing tests a vigorous growth of *Fomes annosus* was obtained in presence of low concentrations of sodium carbonate. It seemed possible nevertheless that acidity of the medium was a condition of the continued growth of the fungus, and that consequently a sufficient initial alkalinity might inhibit this growth. My further investigations have shown that such is the case. For example, sodium chloride requires a concentration of 6% to inhibit totally the growth of *Fomes annosus*, which is however totally inhibited by 0.33% sodium carbonate. Barium chlorid does not inhibit at 10% concentration, but barium carbonate totally inhibits at 0.625%, and with very small transplants total inhibition was accomplished with several cultures containing but 0.55% $BaCO_3$. These compare with a killing point of 0.50% for zinc chlorid, and 0.55% for commercial creosote.

Sodium carbonate has therefore been demonstrated to have a powerful preservative action when used to impregnate the body of the timber; however, on account of the relatively high solubility of the salt it is not regarded as desirable for use in exposed places, unless the timber is externally protected by paint or otherwise.

Barium is preferably applied as the hydroxid, which is soon converted into carbonate by the action of the air. A solution of barium hydroxid is readily prepared by dissolving barium chlorid with about one-third of its weight of sodium hydroxid, and such solutions are suitable wherever the by-product sodium chlorid is not objectionable. Wood which is to be in contact with electrical circuits is preferably treated with barium hydroxid unmixed with chlorids. Barium hydroxid has the important advantage of being non-corrosive toward iron and steel. Barium carbonate has the additional advantage of being practically insoluble in water, and therefore not subject to material loss through leaching, in contradistinction to such soluble salts as zinc chlorid, sodium fluorid, sodium carbonate and the like.

Solutions of barium hydroxid emulsify readily with crude petroleum, forming very stable emulsions therewith, and can be used in preservatives of the emulsion type, in which oil is the continuous and the aqueous alkaline solution the dispersed phase.

The carbonates of the other alkaline earth metals, calcium and strontium, cannot replace barium carbonate with advantage. Strontium carbonate does not prevent growth of *Fomes annosus* at 1.50% concentration and calcium carbonate permits growth at 1.0% concentration. Barium carbonate moreover possesses the advantage of a decided toxicity toward animal life.

I claim:

1. Method of treating wood to preserve it from fungi of the wood-rotting type, consisting in impregnating it with an emulsion comprising a hydrocarbon oil and a basic substance including barium hydroxid, said basic substance in proportion to inhibit the growth of said fungi.

2. Method of treating wood to preserve it from fungi of the wood-rotting type, consisting in impregnating it with an emulsion comprising a hydrocarbon oil and a basic barium compound, said barium compound in proportion to inhibit the growth of said fungi.

3. Method of preserving wood, comprising impregnating it with a solution containing barium hydroxid and transforming the said hydroxid to carbonate within the body of the wood.

4. Method of preserving wood, comprising impregnating it with an emulsion, comprising a hydrocarbon oil and a solution containing barium hydroxid, and transforming said hydroxid to carbonate within the body of the wood.

In testimony whereof, I affix my signature.

LEO P. CURTIN.